Oct. 23, 1928.  
J. SAMUELS  
BOTTLE COOLER  
Filed June 22, 1927
1,689,054
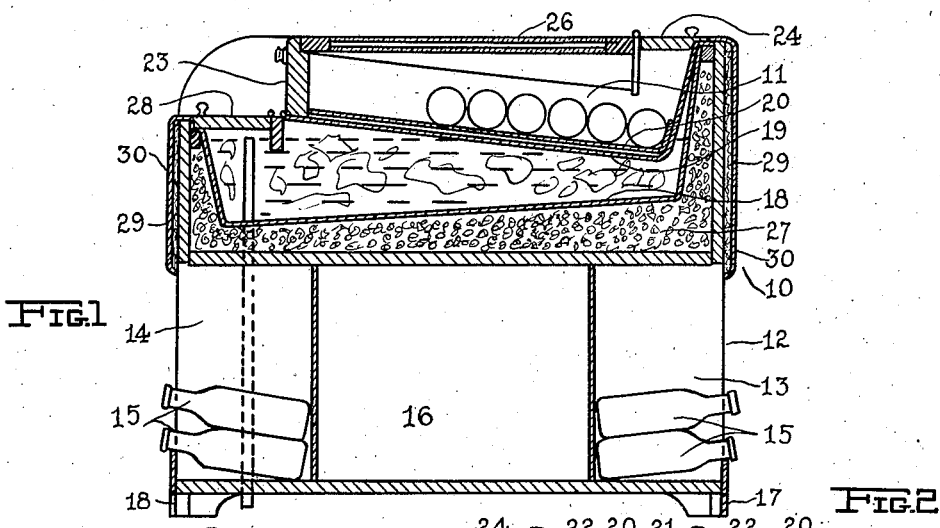
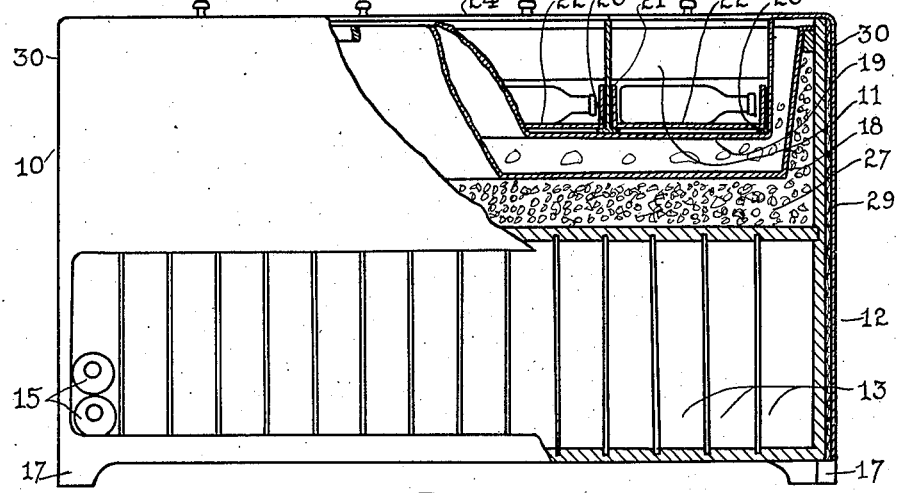
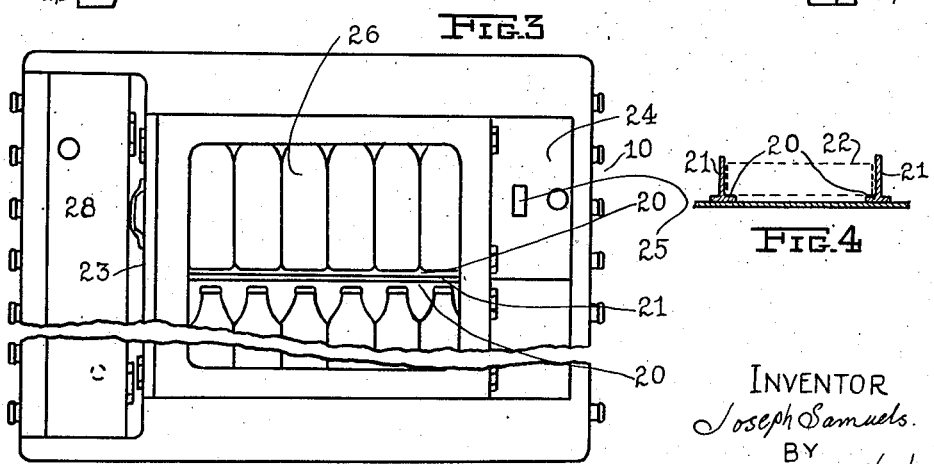
INVENTOR  
Joseph Samuels.  
BY  
E.J. Fetherstonhaugh.

Patented Oct. 23, 1928.

1,689,054

UNITED STATES PATENT OFFICE.

JOSEPH SAMUELS, OF TORONTO, ONTARIO, CANADA.

BOTTLE COOLER.

Application filed June 22, 1927. Serial No. 200,648.

This invention relates to a bottle cooler as described in the present specification and illustrated in the accompanying drawings which form part of the same.

The invention consists essentially of the novel features pointed out broadly and specifically in the claims for novelty following a description containing an explanation in detail of an acceptable form of the invention.

The objects of the invention are to furnish a cooling and storage means for bottles of all descriptions containing beverages and other liquids which are necessary to be kept in a cool place; to provide convenient means for store keepers, beverage stands, households and other places for keeping a supply of bottles containing liquids in an attractive manner, storing them up in means adjacent to the cooling system; to have a quantity of bottles suitably placed in a cooling chamber in such a manner as to be easily accessible; to construct a bottle cooler in such a way that all the parts thereof can be easily taken apart and thoroughly cleaned, thereby insuring sanitary conditions; and generally, to provide a cooler which will be of durable construction and efficient for its purpose.

In the drawings, Figure 1 is a side view in section of the bottle cooler.

Figure 2 is a front view of the bottle cooler shown partly in section.

Figure 3 is a top plan view of the bottle cooler.

Figure 4 is a detail of the slideway for the pan insert.

Like numerals of reference indicate corresponding parts in the various figures.

Referring to the drawings, the bottle cooler 10 is formed in two sections consisting of a cooling chamber 11 and a bottle storage chamber 12. The storage chamber 12 is divided off into a plurality of sections 13 and 14, these sections being formed at each end of the chamber in which the bottles 15 are stored in a horizontal position, one above the other. Dividing off the end bottle sections 13 and 14 is an air space compartment 16. The storage chamber is preferably supported on the standards 17 and 18 and supports the cooling chamber 11 at the upper end.

The cooling chamber 11 consists of the ice box 18 having the upper floor wall 19 on a sliding plane, having the lower portion thereof facing the front end of the cooling chamber. This flooring 19 has a plurality of slideways 20 and 21 forming guideways for a plurality of pans 22. Each of these pans is filled with the desired beverage and slidable independent of one another if desired.

In carrying out the construction of the invention, one pan may be used instead of a number, and this pan could be divided into a plurality of sections, as shown in the accompanying drawings. The bottle holders are made into separate pans slidable in guideways on the flooring of the ice box.

The cooling chamber has at one end the inlet doors 23 and at the other end the outlet doors 24 and on the outlet doors are the tabulations 25 denoting the various assortments of beverages contained in the various pans. Overlooking the pans on the cover 24 of the cooling chamber is the glass top 26 adapted to be used to see the quantity of bottles remaining in the pans from time to time. The ice is placed within the ice box 18 by means of the rear door 28, the ice being crushed according to size. The walls of the bottle cooler are preferably insulated by means of the cork 27 and felt 29, the container walls themselves being preferably made of sheet metal 30.

It will thus be seen that one important feature is in the slanting floor of the ice box. This floor could be either curved or arranged in a different manner so long as the bottles are allowed to roll in above the level of the outlet for the bottles.

Another important features lies in the air space compartment intermediate of the bottle sections and beneath the ice chamber, so that to a certain degree the bottles in the reserved sections will be kept comparatively cool as well as the bottles placed above the ice box within the ice chamber.

The actual size of the construction may of course be varied according to requirements, that is to say that when the bottle cooler is constructed for a large beverage dispensary, the construction of the ice box may be varied for inserting other cooling systems apart from ice and the inlet and outlet for the bottles may be so arranged as to be managed from one side only so long as the support over the cooling system has one end for receiving the bottles on a higher plane than the other end where the bottles are taken away.

In the operation of the invention as herein specifically described to an ice chamber, the ice is first packed into its chamber from the inlet door at one end. The bottles are then placed in their respective pans and are slidably placed in the slideways of the ice-box flooring, the bottles being preferably placed on their side so that they can roll down towards the lower level of the ice flooring. A convenient supply of beverage bottles is placed in the lower shelves or sections of the bottle chamber 12 and the ice chamber can be filled with bottles whenever desired from those therebelow. There may be always bottles stored in the ice chamber for the demand as the glass casing in the cover of the cooling chamber will always tell the operator or service man as to the number of bottles on the ice. The doors themselves may be so arranged as to pull out in the form of cupboards or in the form of roll tops, each provided with suitable locking means.

What I claim is:

1. In a bottle cooler, an ice chamber and a reservoir chamber, an ice box in said ice chamber having the cover thereof divided off into a plurality of sections by flanges forming slideways for a corresponding number of pans adapted to contain a plurality of bottles, said ice box cover being on a slanting plane, a plurality of doors leading to said ice chamber for inserting the ice and bottles and a plurality of outward doors adapted for removing the bottles from said ice chamber.

2. In a bottle cooler, an ice chamber and reservoir chamber, an ice box in said ice chamber having the cover thereof divided off into a plurality of sections by flanges adapted to form slideways for a plurality of pan members, means for inserting and removing a number of bottles placed in said pan members, said removing means being on a lower plane than said inserting means, and a plurality of partitions in said reservoir chamber forming a plurality of compartments on either side of an air space chamber beneath said ice chamber.

Signed at Toronto, Canada, this 17th day of May, 1927.

JOSEPH SAMUELS.